(No Model.)
H. C. SPALDING.
ELECTRIC CIRCUIT.
No. 327,495. Patented Sept. 29, 1885.
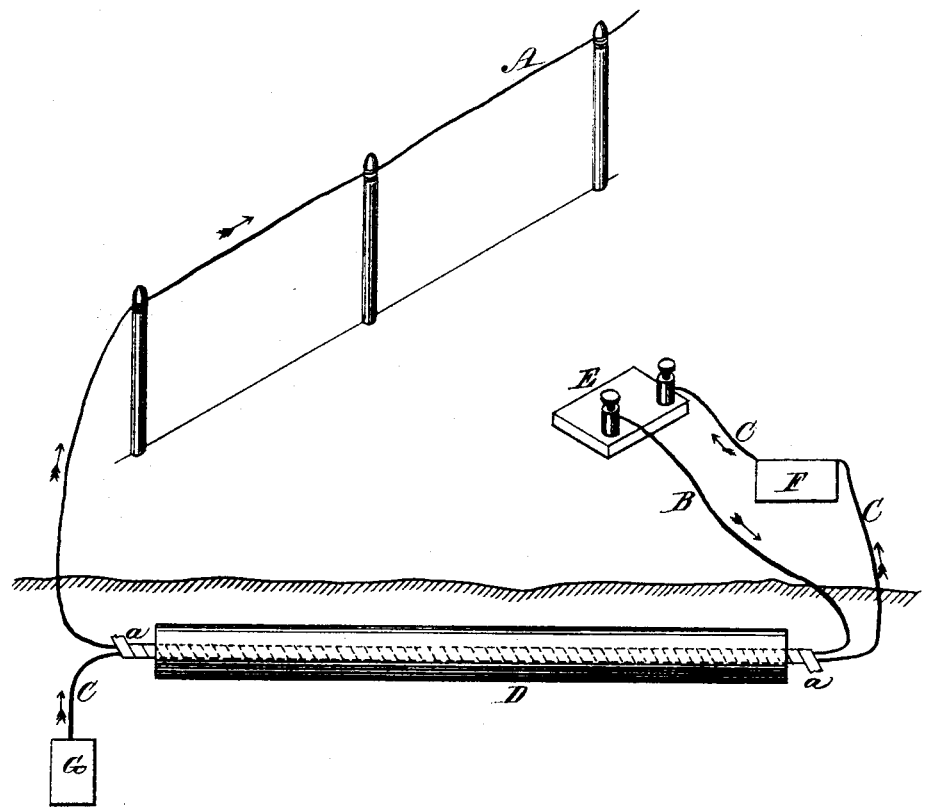
WITNESSES
Alex. L. Hayes
Sanford K. Dudley
INVENTOR
Henry C. Spalding

UNITED STATES PATENT OFFICE.

HENRY C. SPALDING, OF BOSTON, MASSACHUSETTS.

ELECTRIC CIRCUIT.

SPECIFICATION forming part of Letters Patent No. 327,495, dated September 29, 1885.

Application filed November 19, 1883. Renewed February 28, 1885. (No model.)

*To all whom it may concern:*

Be it known that I, HENRY C. SPALDING, a citizen of the United States, and a resident of Boston, in the county of Suffolk and State of Massachusetts, have invented certain new and useful Improvements in Electric Circuits, of which the following is a specification, reference being had to the drawing accompanying and forming a part of the same.

The enormous increase in the number of telegraphic, telephonic, and other conductors in cities and towns renders it necessary to make some disposition of them other than that at present generally adopted of stringing them on poles or house-tops. To bring the wires into closer proximity is obviously impracticable, hence the use of underground cables or some form of conduit is unavoidable. Inasmuch, however, as space is the main consideration, it is not customary or desirable to extend the underground or conduit systems beyond the limits of the cities, or even their more crowded portions. The lines leading out of cities, therefore, are partly under ground and partly aerial. Such lines have been found to be exposed to all the difficulties met with in those which are wholly under ground, the obstacles to rapid and perfect working, due, for example, to retardation from external currents, the immediate proximity of the earth, or to induction, and the like, being a serious hindrance.

My invention relates to circuits or lines such as those described—that is to say, which begin or which end as underground lines, the remainder being ordinary aerial lines suspended at such a distance from other wires as not to be seriously affected by induction or retardation; and it has for its object to overcome or prevent the electrical inductive effects due to the earth's electricity and to currents flowing in other conductors in very close proximity, such as is unavoidably the case in the underground portion of the system. To this end I make the underground portions of the circuit completely metallic, using two wires inclosed in an insulated metallic sheath, while for the aerial portions I use the ground as part of the circuit. This diposition will be understood from the accompanying diagram.

F represents a generator and E a receiving or transmitting instrument of a given line, which leads from the center of a city, for exple, to some distant point.

The conductors B C, forming the leading and return wires, respectively, are surrounded by a metal sheath, which is itself insulated. This sheath I prefer to form by wrapping around the insulated wires a strip of metal foil, $a$, as more fully explained by me in another application. The wires and sheath are carried through the city through an underground conduit, D, at the end of which the wire C is grounded, while the wire B is carried on to the desired point as an aerial line, A. It is obvious that this disposition of the wires may be made at either or both ends of the line. It will be seen by this arrangement that those portions of a line which are exposed to the effects of electrical induction and like disturbances are protected, while the least practicable amount of wire and insulating material are used.

I have confined the description to circuits in part aerial and in part underground. I would state, however, that the conduits containing the wires are not necessarily buried in the earth, as they may be supported above it.

I am aware that portions of an electrical circuit have heretofore been formed by the insulated conductors of underground systems; but this I do not claim, broadly. The purpose of my invention, as will be seen from the above description, is not only to lessen the effects of induction, but to prevent, also, the retardation that exists in lines or circuits that are partly aerial and partly subterranean. I have described as the best means for accomplishing this a protective underground system, invented by me and made the subject of other applications, combined with an aerial line; but it is evident that the specific character of the underground portion of the circuit may be greatly varied without departure from the invention.

I do not claim herein the specific form of cable described, as this forms the subject of another application; but

What I claim is—

1. An electric circuit composed in part of an aerial line and the ground and in part of two insulated conductors inclosed in a metal sheath in an insulating-conduit, the two conductors constituting, respectively, leading and return wires, and the return-wire being grounded at the end of the conduit, substantially as and for the purpose specified.

2. An electric circuit consisting in part of two conductors insulated from one another and inclosed within an insulated metallic sheath and in part of an aerially-suspended wire, the suspended wire and one of the insulated wires being connected to earth at or beyond the same end of the said sheath, substantially as and for the purpose herein set forth.

In witness whereof I have hereunto set my name in the presence of two subscribing witnesses.

HENRY C. SPALDING.

Witnesses:
ALEX. L. HAYES,
SANFORD H. DUDLEY.